(12) United States Patent
Xue et al.

(10) Patent No.: US 11,513,245 B2
(45) Date of Patent: Nov. 29, 2022

(54) ARTIFICIAL INTELLIGENCE CALCULATION METHOD AND APPARATUS FOR MONITORING EARTHQUAKE IN REAL TIME BASED ON EDGE CLOUD COOPERATION, AND STORAGE MEDIUM

(71) Applicant: INSTITUTE OF GEOLOGY AND GEOPHYSICS, CHINESE ACADEMY OF SCIENCES, Beijing (CN)

(72) Inventors: Qingfeng Xue, Beijing (CN); Yibo Wang, Beijing (CN); Yi Yao, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/507,742

(22) Filed: Oct. 21, 2021

(65) Prior Publication Data

US 2022/0179111 A1      Jun. 9, 2022

(30) Foreign Application Priority Data

Dec. 9, 2020   (CN) .......................... 202011424728.9

(51) Int. Cl.
  *G01V 1/00*    (2006.01)
  *G06N 20/00*   (2019.01)
  (Continued)

(52) U.S. Cl.
  CPC .............. *G01V 1/008* (2013.01); *G01V 1/288* (2013.01); *G01V 1/30* (2013.01); *G01V 1/34* (2013.01); *G06N 20/00* (2019.01)

(58) Field of Classification Search
  CPC .......... G06N 20/00; G01V 1/288; G01V 1/34; G01V 1/30; G01V 1/008
  See application file for complete search history.

(56) References Cited

U.S. PATENT DOCUMENTS

2018/0260734 A1*   9/2018   Beveridge .............. G06N 20/00
2022/0027793 A1*   1/2022   Bang ...................... G06N 20/00

FOREIGN PATENT DOCUMENTS

| CN | 1086317 A | 5/1994 |
|---|---|---|
| CN | 1871528 A | 11/2006 |

(Continued)

OTHER PUBLICATIONS

Xiaopu Zhang et al: "An Efficient Neural-Network-Based Microseismic Monitoring Platform for Hydraulic Fracture on an Edge Computing Architecture", «Sensors» , pp. 1-19.

(Continued)

*Primary Examiner* — Elias Desta (57) ABSTRACT

An artificial intelligence calculation method and apparatus for monitoring an earthquake in real time based on edge cloud cooperation is applied to a micro-earthquake data processing system. The micro-earthquake data processing system includes an edge calculation device and a remote server in communication connection with the edge calculation device. The remote server deploys a micro-earthquake data analyzing model based on an artificial intelligence to the edge calculation device in advance. The method includes steps of receiving, by the remote server, effective event data related to the micro-earthquake from the edge calculation device; performing a transfer training to the micro-earthquake data analyzing model by the remote server according to the effective event data; and updating the model after the micro-earthquake data analyzing model that has been transfer-trained is transmitted to the edge calculation device by the remote server.

3 Claims, 8 Drawing Sheets

(51) Int. Cl.
*G01V 1/28* (2006.01)
*G01V 1/30* (2006.01)
*G01V 1/34* (2006.01)

(56) References Cited

FOREIGN PATENT DOCUMENTS

| CN | 101512382 A | 8/2009 |
|---|---|---|
| CN | 104020746 A | 9/2014 |
| CN | 105629305 A | 6/2016 |
| CN | 108508477 A | 9/2018 |
| CN | 110716229 A | 1/2020 |
| CN | 111929721 A | 11/2020 |

OTHER PUBLICATIONS

Zhu, Lijun: "Seismic processing via machine learning for event detection and phase pick", «Georgia Institute of Technology», pp. 2, 14-24, 44-45, 55-56, 63-66, 97-103.

\* cited by examiner

ARTIFICIAL INTELLIGENCE CALCULATION METHOD AND APPARATUS FOR MONITORING EARTHQUAKE IN REAL TIME BASED ON EDGE CLOUD COOPERATION, AND STORAGE MEDIUM

BACKGROUND OF THE INVENTION

Technical Field

The present application relates to the technical field of earthquake monitoring, and in particular to an artificial intelligence calculation method, an apparatus for monitoring an earthquake in real time based on edge cloud cooperation, and a non-transitory storage medium.

Description of the Related Art

A micro-earthquake data collecting device is widely applied in passive source earthquake response monitoring such as unconventional oil and gas development micro-earthquake and induced earthquake monitoring, background noise monitoring, urban underground space probe, etc. The conventional micro-earthquake monitoring process includes manual layout of stations, long-time collection of data, manual reception of stations, data reading, sorting, processing and analysis, etc. However, with the continuous improvement of monitoring requirements, there is a growing need to perform micro-earthquake monitoring and data processing and analysis in real time, thereby facilitating to acknowledge the changes of underground media in real time, dynamically adjusting the construction scheme or using emergency processing means, etc. With the continuous development of a data transmission technology, the micro-earthquake data collecting device gradually has a function of transmitting data in real time by continuously integrating technologies like Ethernet or wireless WIFI, etc (Barakat et al, 2010; Jamali-Rad et. Al., 2018). There have been many kinds of products of the micro-earthquake data collecting device at home and abroad, such as SmartSolo IAU-19 and SD-20 of the DTCC company in Canada (such product will be launched soon), WTU 508 of the Sercel company in France, GSX-C of the Geospace company in the United States, Centaur of the Nanometrics company in Canada, Wrangler of the RRF TEK company in the United States, and Minimus+ of the Güralp company of England, Quanterra Q330M+ of the Kinemetrics company in the United States, and EDAS-27HR of the Gangzhen scientific and technical company in China, etc.

Most of the existing mainstream micro-earthquake collecting devices use a STA/LTA long short time window ratio method to identify effective micro-earthquake events. This method is more suitable for picking up effective events of the natural earthquake, and has poor identification accuracy for data of the micro-earthquake and the induced earthquake with a relatively low signal-to-noise ratio. At present, this method is replaced by various artificial intelligence methods such as machine learning, deep learning, etc. The current micro-earthquake collecting devices write the fixed effective event identifying and calculating parameters into the devices before monitoring, but cannot adjust the parameters adaptively according to the environment noise, ground coupling or the like during the monitoring process.

With respect to the technical problem that it is impossible to adjust parameters adaptively according to the actual detection environment or ground conditions since the parameters of the algorithm model of the micro-earthquake collecting devices are fixed, and thus it is impossible to accurately collect micro-earthquake data according to the actual environment in the above prior art, there is no effective solution at present.

SUMMARY OF THE INVENTION

An embodiment of the present disclosure provides an artificial intelligence calculation method for monitoring an earthquake in real time based on edge cloud cooperation, so as to at least solve the technical problem that it is impossible to adjust parameters adaptively according to the actual detection environment or ground conditions since the parameters of the algorithm model of the micro-earthquake collecting devices are fixed, and thus it is impossible to accurately collect micro-earthquake data according to the actual environment in the prior art.

According to an aspect of the embodiment of the present disclosure, there is provided an artificial intelligence calculation method for monitoring an earthquake in real time based on edge cloud cooperation, which is applied to a micro-earthquake data processing system. The micro-earthquake data processing system comprises an edge calculation device and a remote server in communication connection with the edge calculation device, wherein the remote server deploys a micro-earthquake data analyzing model based on an artificial intelligence to the edge calculation device in advance. Moreover, the method comprises: receiving, by the remote server, effective event data related to the micro-earthquake from the edge calculation device, wherein the effective event data is obtained, by the edge calculation device, by means of calculating and analyzing the micro-earthquake data collected by the edge calculation device by using the micro-earthquake data analyzing model; performing a transfer training to the micro-earthquake data analyzing model by the remote server according to the effective event data; and updating the model after the micro-earthquake data analyzing model that has been transfer-trained is transmitted to the edge calculation device by the remote server.

According to another aspect of the embodiment of the present disclosure, there is further provided a non-transitory storage medium that includes a storage program, wherein the method as stated by any one of the above is executed by a processor when the program is running.

According to another aspect of the embodiment of the present disclosure, there is further provided a micro-earthquake data processing apparatus, which is applied to a micro-earthquake data processing system. The micro-earthquake data processing system comprises an edge calculation device and a remote server that is in communication connection with the edge calculation device, wherein the remote server deploys a micro-earthquake data analyzing model based on the artificial intelligence to the edge calculation device in advance. Moreover, the apparatus comprises: a data receiving module for receiving, by the remote server, effective event data related to the micro-earthquake from the edge calculation device, wherein the effective event data is obtained, by the edge calculation device, by means of calculating and analyzing the micro-earthquake data collected by the edge calculation device by using the micro-earthquake data analyzing model; a transfer training module for performing a transfer training to the micro-earthquake data analyzing model by the remote server according to the effective event data; and a model updating module for updating the model after the micro-earthquake data analyzing model that has been transfer-trained is transmitted to the edge calculation device by the remote server.

According to another aspect of the embodiment of the present disclosure, there is further provided a micro-earthquake data processing apparatus, which is applied to a micro-earthquake data processing system. The micro-earthquake data processing system comprises an edge calculation device and a remote server that is in communication connection with the edge calculation device, wherein the remote server deploys a micro-earthquake data analyzing model based on the artificial intelligence to the edge calculation device in advance, comprising: a processor; and a memory connected to the processor, which is used for providing instructions to process the following processing steps to the processor: receiving, by the remote server, effective event data related to the micro-earthquake from the edge calculation device, wherein the effective event data is obtained, by the edge calculation device, by means of calculating and analyzing the micro-earthquake data collected by the edge calculation device by using the micro-earthquake data analyzing model; performing a transfer training to the micro-earthquake data analyzing model by the remote server according to the effective event data; and updating the model after the micro-earthquake data analyzing model that has been transfer-trained is transmitted to the edge calculation device by the remote server.

In the embodiment of the present disclosure, the remote server can receive the effective event data from the edge calculation device, then perform a transfer training to the micro-earthquake data analyzing model deployed by the edge calculation device using the effective event data, and finally updates the model by transmitting the model that has been transfer-trained to the edge calculation device. Thus, compared with use of the fixed algorithm model in the prior art, this scheme can flexibly update the model according to the actually collected effective event data, thereby realizing the purpose of capable of dealing with different geographical conditions, and achieving the technical effect of accurately collecting micro-earthquake data according to the actual geographical conditions. In addition, the collected data can be analyzed and processed using the model at the edge calculation device side, such that only the effective event data is transmitted to save resources and improve the transmission efficiency. Thereby, the technical problem that it is impossible to adjust parameters adaptively according to the actual detection environment or ground conditions since the parameters of the algorithm model of the micro-earthquake collecting devices are fixed, and thus it is impossible to accurately collect micro-earthquake data according to the actual environment in the prior art is solved.

BRIEF DESCRIPTION OF THE DRAWINGS

The accompanying drawings explained herein, which form a part of the present application, serve to provide a further understanding of the present application. The illustrative embodiments of the present application and the description of the drawings serve to explain the present disclosure and are not to be construed as unduly limiting the present disclosure. In the drawings.

DESCRIPTION OF THE EMBODIMENTS

In order to make those skilled in the art understand the solution of the present disclosure better, the technical solutions in embodiments of the present disclosure will be described clearly and comprehensively below in conjunction with accompanying drawings of the embodiments of the present disclosure. Apparently, the described embodiments are merely some of rather than all of the embodiments of the present disclosure. Based on the embodiments of the present disclosure, all other embodiments obtained by those of ordinary skilled in the art without making creative efforts should fall within the scope of protection of the present disclosure.

It should be noted that the terms "first", "second" and so forth in the description and claims as well as the drawings of the present disclosure are used to distinguish similar objects, and are not necessarily to describe a particular order or sequential order. It should be understood that the data used this way may be interchanged where appropriate in order to facilitate the embodiments of the present disclosure described here to be implemented in an order except for the orders illustrated or described herein. In addition, terms "comprising", "having", and any variations thereof are intended to cover non-exclusive inclusions, for example, processes, methods, systems, products or devices that contain a series of steps or units need not be limited to those explicitly listed steps or units, but may include other steps or units not explicitly listed or inherent to these processes, methods, products or devices.

Embodiment 1

According to the present embodiment, there is provided an embodiment of the artificial intelligence calculation method for monitoring an earthquake in real time based on edge cloud cooperation. It needs to be explained that steps illustrated in the flow chart of the drawings can be executed in a computer system such as a set of computer executable instructions, and although the logical order is shown in the flow chart, the steps shown or described may be executed in an order different from the order here in some cases.

Figure 1:
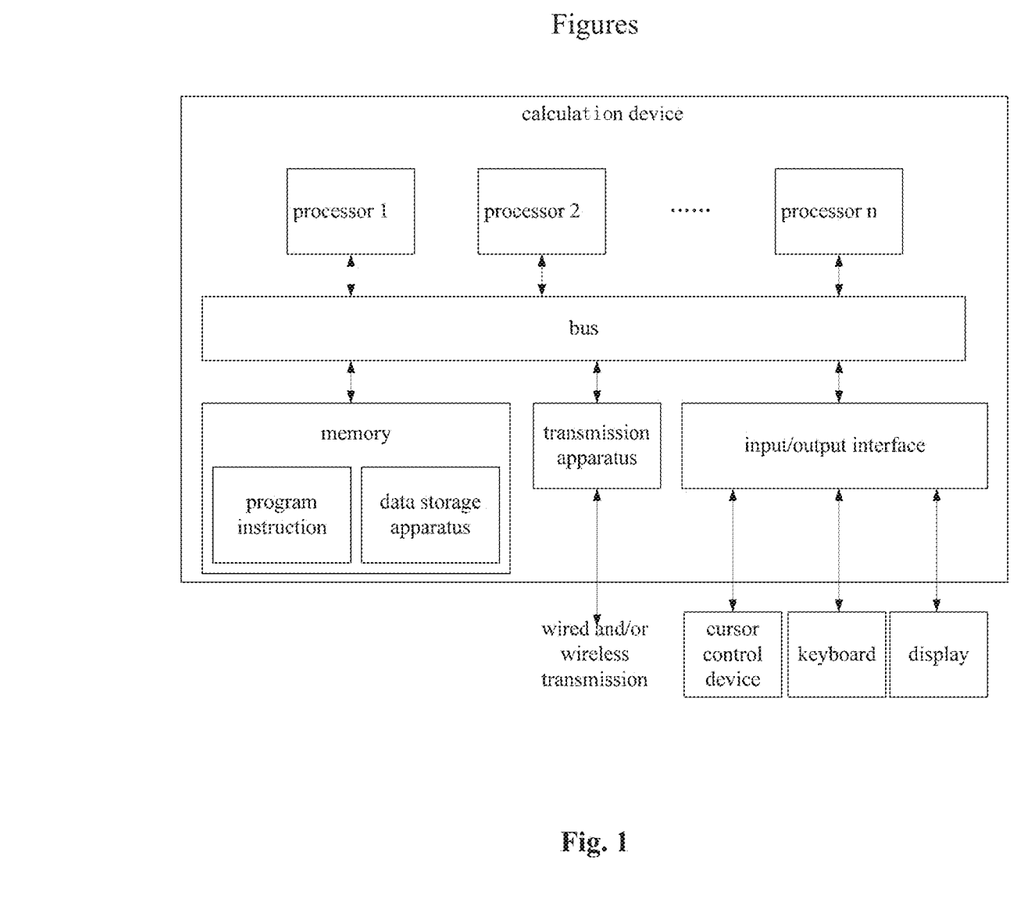
FIG. 1 is a block diagram of structures of hardware of the calculation device for implementing the method according to Embodiment 1 of the present disclosure.

The method embodiment provided in the present embodiment can be executed in a server or a similar calculation device. FIG. 1 illustrates a block diagram of structures of hardware of a calculation device for implementing the micro-earthquake data processing method. As shown in FIG. 1, the calculation device may include one or more processor(s) {the processor(s) may include, but is not limited to, a processing apparatus such as a microprocessor micro control unit (MCU) or a programmable logic device field-programmable gate array (FPGA)}, a memory for storing data and a transmission apparatus for a communication function. Except this, it may also include: a display, an input/output interface (I/O interface), a universal serial bus (USB) port (which can be included as one of the ports of I/O interface), a network interface, a power supply and/or a camera. It can be understood by those skilled in the art that the structure shown in FIG. 1 is only illustrative, and does not limit structures of the above electronic apparatus. For example, the calculation device may further include components more or less than those shown in FIG. 1, or have a configuration different from that shown in FIG. 1.

It should be noted that the above one or more processor(s) and/or other data processing circuits may generally be referred to as "a data processing circuit" in the text. The data processing circuit may be fully or partially embodied as software, hardware, firmware or any other arbitrary combination. In addition, the data processing circuit may be a single and independent processing module, or all or part of them may be integrated into any one of the other elements in the calculation device. As mentioned in the embodiment of the present disclosure, the data processing circuit is controlled as a processor (for example, selection of the variable resistor terminal path connected with the interface).

The memory may be used to store software programs and modules of the application software, such as the program instruction/data storage apparatus corresponding to the micro-earthquake data processing method in the embodiment of the present disclosure. The processor executes various functional applications and data processing by running the software programs and the modules stored in the memory, that is, realize the micro-earthquake data processing method of the above application program. The memory may include a high-speed random memory, and may also include a nonvolatile memory, such as one or more magnetic storage apparatus(s), a flash memory, or other nonvolatile solid-state memory. In some examples, the memory may further include a memory remotely set with respect to the processor, and the remote memory may be connected to the calculation device via a network. Examples of the above networks include but are not limited to the Internet, Intranet, LAN, mobile communication network and their combinations.

The transmission apparatus is used for receiving or transmitting data via a network. The specific examples of the above network may include a wireless network provided by a communication provider of the calculation device. In one example, the transmission apparatus includes a network interface controller (NIC), which can be connected to other network devices through a base station, so as to communicate with the Internet. In one example, the transmission apparatus may be a radio frequency (RF) module for communicating wirelessly with the Internet.

The display may be for example a touch-screen-typed liquid crystal display (LCD), which enables a user to interact with a user interface of the calculation device.

It should be explained here that in some optional embodiments, the calculation device shown in FIG. 1 may include hardware elements (including circuits), software elements (including computer codes stored on a computer-readable medium), or a combination of hardware elements and software elements. It should be pointed out that FIG. 1 is only an example of a specific example and is intended to show types of components that may exist in the calculation device.

Figure 2:
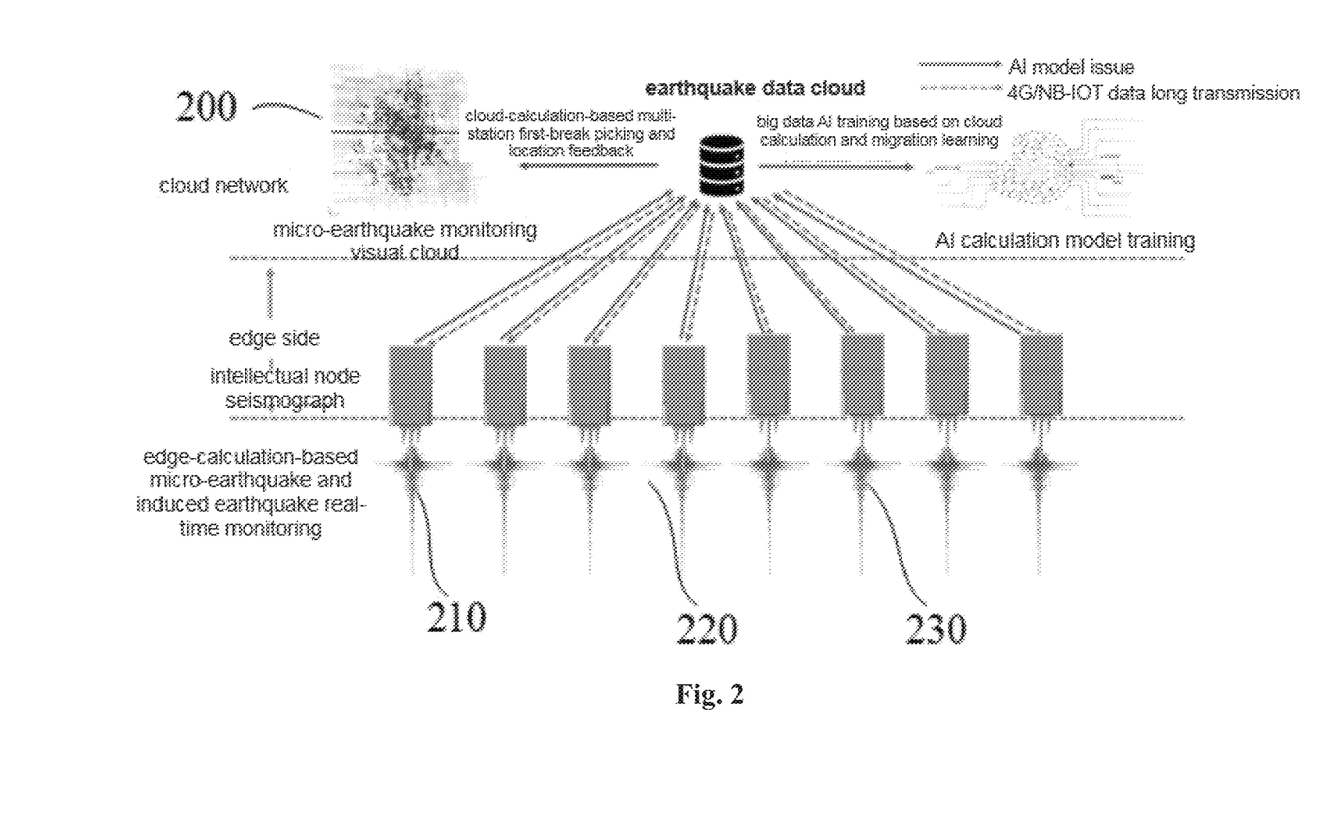
FIG. 2 is a schematic diagram of the micro-earthquake data processing system according to Embodiment 1 of the present disclosure.

FIG. 2 is a schematic diagram of the micro-earthquake data processing system according to the present embodiment. Referring to FIG. 2, the system comprises an edge calculation device and a remote server 200 that is in communication connection with the edge calculation device, wherein a number of the edge calculation devices may be more, for example, edge calculation devices 210-230. The edge calculation devices are disposed at different location respectively to collect and process the micro-earthquake data. The remote server 200 may be for example a cloud server (or referred to as a cloud network), and the remote server 200 deploys the micro-earthquake data analyzing model based on the artificial intelligence to the edge calculation devices 210-230 in advance. The edge calculation devices 210-230 can process the collected data using the micro-earthquake data analyzing model based on the artificial intelligence, so as to obtain effective micro-earthquake data and feed back to the cloud server 200. Wherein, the micro-earthquake data analyzing model based on the artificial intelligence can be trained by training based on a convolution neural network model and/or a cyclic neural network model, and the training data can for example use data in the standard micro-earthquake database. It should be explained that both the remote server 200 and the edge calculation devices 210-230 in the system are applicable to the hardware structures described above.

Figure 3:
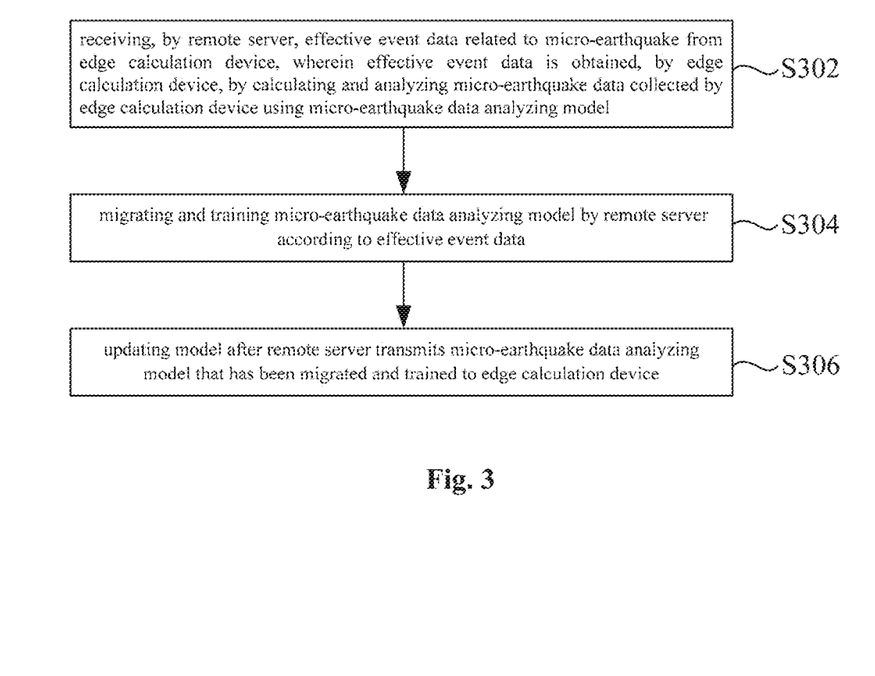
FIG. 3 is a schematic diagram of a flow of the micro-earthquake data processing method according to the first aspect of Embodiment 1 of the present disclosure.

In the above running environment, according to the first aspect of the present embodiment, there is provided an artificial intelligence calculation method for monitoring an earthquake in real time based on edge cloud cooperation, which is implemented by the remote server 200 shown in FIG. 2. FIG. 3 illustrates a schematic diagram of a flow of the method. Referring to FIG. 3, the method comprises:

S302: receiving, by the remote server, effective event data related to the micro-earthquake from the edge calculation device, wherein the effective event data is obtained, by the edge calculation device, by means of calculating and analyzing the micro-earthquake data collected by the edge calculation device by using the micro-earthquake data analyzing model;

S304: performing a transfer training to the micro-earthquake data analyzing model by the remote server according to the effective event data; and S306: updating the model after the micro-earthquake data analyzing model that has been transfer-trained is transmitted to the edge calculation device by the remote server.

As stated in the Description of the Related Art, most of the existing mainstream micro-earthquake collecting devices use a STA/LTA long short time window ratio method to identify effective micro-earthquake events. This method is more suitable for picking up effective events of the natural earthquake, and has poor identification accuracy for data of the micro-earthquake and the induced earthquake with a relatively low signal-to-noise ratio. At present, this method is being replaced by various artificial intelligence methods such as machine learning, deep learning, etc. The current micro-earthquake collecting devices write the fixed effective event identifying and calculating parameters into the devices before monitoring, but cannot adjust the parameters adaptively according to the environment noise, ground coupling or the like during the monitoring process.

With respect to the technical problem in the Description of the Related Art, in the technical solution of the present embodiment, the remote server 200 first receives effective event data related to the micro-earthquake from the edge calculation device (e.g. the edge calculation device 210) in step S302. Wherein, the effective event data is obtained, by the edge calculation device, by means of calculating and analyzing the micro-earthquake data collected by the edge calculation device by using the micro-earthquake data analyzing model. In one specific example, the effective event data can for example only be earthquake ripples. The edge calculation device 210, after collecting the micro-earthquake data, can process the collected data by the micro-earthquake data analyzing model, such as removing noise data, ineffective data, etc., and then transmit the collected data to the remote server 200. Thus, the micro-earthquake data analyzing model can be used to process the micro-earthquake data preliminarily at the edge calculation device side, which can significantly reduce the amount of data transmission, save calculation resources and improve the efficiency of data transmission. Further, the above effective event data can also be data obtained by preliminarily calculating the micro-earthquake data analyzing model, and there is no specific limitation on forms and contents of the effective event data herein. In addition, in one preferred example, the edge calculation device can directly use the micro-earthquake data analyzing model to collect data, thereby obtaining the effective event data directly.

Further, in step S304, the remote server 200 performs a transfer training to the micro-earthquake data analyzing model according to the effective event data, that is, adjusts parameters of the model by performing a transfer training to the model using the actual effective event data, so as to optimally adjust the model. Thus, the model can deal with the actual geographical situation, and is flexibly adjusted according to the actual geographical situation. Wherein, the method of transfer training can for example use the transfer training method in the prior art, and there is no specific limitation herein.

In addition, in order to further guarantee accuracy of the effective event data, the professionals, after receiving the effective event data, can also manually check the data in the present scheme, especially check data for which the current calculation is insufficient, and mark the data. When there are enough labeled data, the model is transfer-trained using the method of transfer training.

Finally, in step S306, the remote server 200 transmits the micro-earthquake data analyzing model that has been transfer-trained to the edge calculation device to update the model. In one specific example, the remote server 200 may for example transmit the parameters changed that has been transfer-trained to the edge calculation device to replace parameters of the model, or the remote server 200 transmits the trained model to the edge calculation device to update the model. Finally, the edge calculation device updates the micro-earthquake data analyzing model.

In this manner, the remote server 200 can receive the effective event data from the edge calculation device 210, then performs a transfer training to the micro-earthquake data analyzing model deployed by the edge calculation device 210 using the effective event data, and finally transmits the model that has been transfer-trained to the edge calculation device 210 to update the model. Thus, compared with use of the fixed algorithm model in the prior art, this scheme can flexibly update the model according to the actually collected effective event data, thereby realizing the purpose of capable of dealing with different geographical conditions, and achieving the technical effect of accurately collecting micro-earthquake data according to the actual geographical conditions. In addition, the collected data can be analyzed and processed using the model at the edge calculation device side, such that only the effective event data is transmitted so as to save resources and improve the transmission efficiency, thereby solving the technical problem that it is impossible to adjust parameters adaptively according to the actual detection environment or ground conditions since the parameters of the algorithm model of the micro-earthquake collecting devices are fixed, and thus it is impossible to accurately collect micro-earthquake data according to the actual environment in the prior art.

Alternatively, the remote server, before the operation of receiving the effective event data related to the micro-earthquake from the edge calculation device, further includes: the edge calculation device collects the micro-earthquake data; the edge calculation device analyzes and calculates the micro-earthquake data using the micro-earthquake data analyzing model and generates the effective event data corresponding to the micro-earthquake data; and the edge calculation device transmits the effective event data to the remote server.

Before the operation that the remote server 200 receives the effective event data related to the micro-earthquake from the edge calculation device (such as the edge calculation device 210), the edge calculation device 210 further needs to collect and process the obtained effective event data. Specifically, the edge calculation device 210 first collects the micro-earthquake data, e.g. earthquake waves or the like. Further, the edge calculation device 210 analyzes and calculates the micro-earthquake data using the micro-earthquake data analyzing model, e.g. calculation such as data cleaning, data conversion and so on, thereby generating the effective event data corresponding to the micro-earthquake data, or directly collecting the required effective event data by the model. Finally, the edge calculation device 210 transmits the effective event data to the remote server 200. Thus, only the required effective event data is transmitted during the data transmission process, such that the amount of data transmission can be reduced to save the resources.

Alternatively, the micro-earthquake data analyzing model includes a feature extraction layer, a feature output layer, and a full connection layer. According to the effective event data, the remote server performs the operation of performing a transfer training to the micro-earthquake data analyzing model, comprising: the remote server freezes network structures of the feature extraction layer; and the remote server trains the mapping relationship between the feature output layer and the full connection layer using the effective event data and the standard micro-earthquake data acquired from the preset standard micro-earthquake database.

Figure 4A:
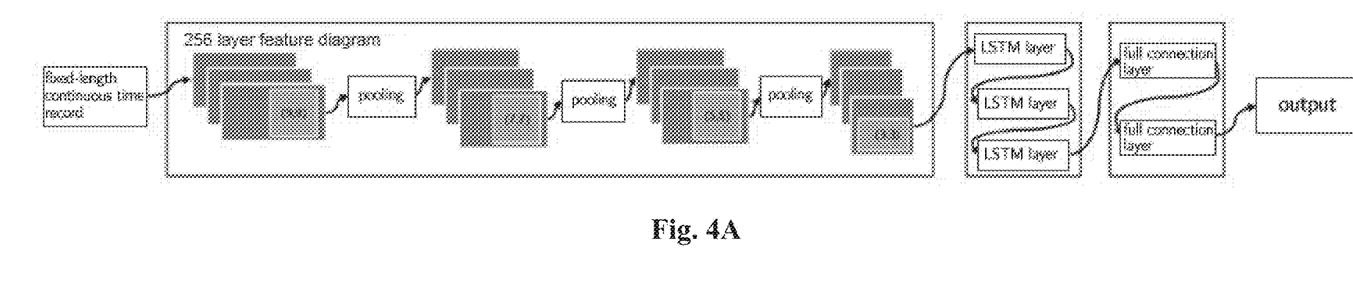
FIG. 4A is a schematic diagram of structures of the micro-earthquake data analyzing model based on the artificial intelligence according to Embodiment 1 of the present disclosure.
Figure 4B:
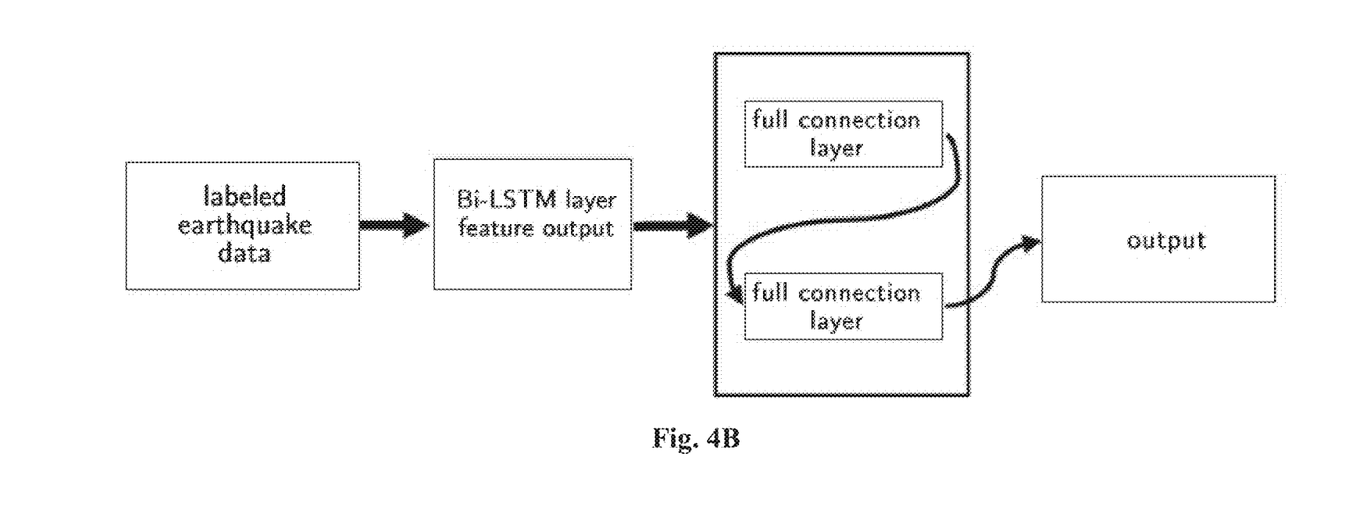
FIG. 4B is a schematic diagram of a transfer training process according to Embodiment 1 of the present disclosure.

Specifically, referring to FIG. 4A, in one optional example, the micro-earthquake data analyzing model is, for example, a micro-earthquake depth picking network MSnet trained using standard data sets. The micro-earthquake depth picking network MSnet is based on a convolutional neural network (CNN) and a recurrent neural network (RNN). The model includes a feature extraction layer, a feature output layer and a full connection layer, wherein the feature extraction layer uses four layers of convolution layers together, the convolution kernel of the first layer is (9,9), the convolution kernel of the fourth layer is (3,3), and there is one pooling layer for which the pooling kernel is 3 between two layers of convolution layers. The feature output layer uses three layers of a long short-term memory (LSTM) structure. Each layer of the LSTM structure contains 632 units, and there additionally is a Projection Layer containing 600 units to perform dimension reduction processing (not shown in the figure). The full connection layer has two layers. Referring to FIG. 4B, in the operation of performing a transfer training to the micro-earthquake data analyzing model, the remote server 200 freezes network structures of the feature extraction layer, that is to say, keeps parameters of the feature extraction layer unchanged. Further, the remote server 200 trains the mapping relationship between the feature output layer and the full connection layer using the effective event data (which can also combine the standard micro-earthquake data acquired from the preset standard micro-earthquake database), i.e., extracts the features output from the last layer of LSTM out, performs fine-tune using the effective event data (which can be marked) and the standard micro-earthquake data acquired from the preset standard micro-earthquake database, and reestablishes the mapping relationship from the feature output layer to the full connection layer. Thus, only the mapping relationship from the feature output layer to the full connection layer of the model is transfer-trained, instead of training the whole model, so as to improve the training speed.

Alternatively, the edge calculation device is a plurality of edge calculation devices, wherein the plurality of edge calculation devices is used to collect the effective event data at different locations, respectively, and perform a transfer training to the micro-earthquake data analyzing model, comprising: the remote server performs a transfer training to the micro-earthquake data analyzing model deployed by the corresponding edge calculation device according to the effective event data transmitted by each edge calculation device.

Specifically, the edge calculation device is a plurality of edge calculation devices, e.g. edge calculation devices 210-230, etc., wherein the plurality of edge calculation devices is used to collect the effective event data at different locations, respectively. In the operation of performing a transfer training to the micro-earthquake data analyzing model, the remote server 200 performs a transfer training to the micro-earthquake data analyzing model deployed by the corresponding edge calculation device according to the effective event data transmitted by each edge calculation device. For example, the remote server 200 performs a transfer training to the micro-earthquake data analyzing model deployed by the edge calculation device 210 using the effective event data transmitted by the edge calculation device 210, the remote server 200 performs a transfer training to the micro-earthquake data analyzing model deployed by the edge calculation device 220 using the effective event data transmitted by the edge calculation device 220, etc. Thus, the transfer training can be performed for models of each edge calculation device respectively, and thus each edge calculation device can deal with geographical situations at different locations.

Alternatively, the plurality of edge calculation devices is divided into a plurality of groups, and performs a transfer training to the micro-earthquake data analyzing model, including: the remote server performs a transfer training to the micro-earthquake data analyzing model deployed by the grouped edge calculation devices according to the effective event data transmitted by the edge calculation devices in each group.

Specifically, referring to FIG. 2, the plurality of edge calculation devices is divided into a plurality of groups, and the plurality of groups is for example deployed at different locations, so that at least one edge calculation device can be deployed at each location. Wherein, the micro-earthquake data analyzing models of the edge calculation devices in each group is for example the same. In the process of performing a transfer training to the micro-earthquake data analyzing models, the remote server 200 performs a transfer training to the micro-earthquake data analyzing model deployed by the grouped edge calculation devices according to the effective event data transmitted by the edge calculation devices in each group (wherein, for example, there may be a master device in each group, which is responsible for summarizing the data and transmitting the data to the server). That is, the model is transfer-trained according to the effective event data, the model that has been transfer-trained is transmitted to the group, and then all the edge calculation devices in the group can update the model. It should be explained here that in order to ensure sources of the data, the edge calculation devices in each group transmits the effective event data to the remote server, including a group number, a device number, the effective event data, etc. Thus, the plurality of edge calculation devices can be set at one location to monitor the micro-earthquake, which is more accurate.

Alternatively, the edge calculation device, before collecting the micro-earthquake data, further includes: determines whether the grouped edge calculation devices satisfy the preset collection conditions; and in a case of satisfying the preset collection conditions, the edge calculation devices in each group collect the micro-earthquake data.

Specifically, in order to avoid the continuously collected micro-earthquake data for being processed, this scheme can also set collection conditions, e.g. the collection conditions are the collection time interval, the collection data requirements, etc. The edge calculation device, before collecting the micro-earthquake data, first needs to determine whether the grouped edge calculation devices satisfy the preset collection conditions. In a case of satisfying the preset collection conditions, the edge calculation devices in each group collect the micro-earthquake data. Therefore, it is unnecessary to perform continuous collection, thereby reducing unnecessary data collection and transmission and relieving the pressure of data analysis on the server side.

Alternatively, determining whether the grouped edge calculation devices satisfy the preset collection conditions includes: the grouped edge calculation devices intra-group broadcast state information, wherein the state information is used to record monitoring states of the edge calculation devices; calculating a number of edge calculation devices in which the state information in the group satisfies the preset trigger condition; and determining whether the grouped edge calculation devices satisfy the preset collection conditions according to the number of devices and a preset first threshold.

Figure 5:
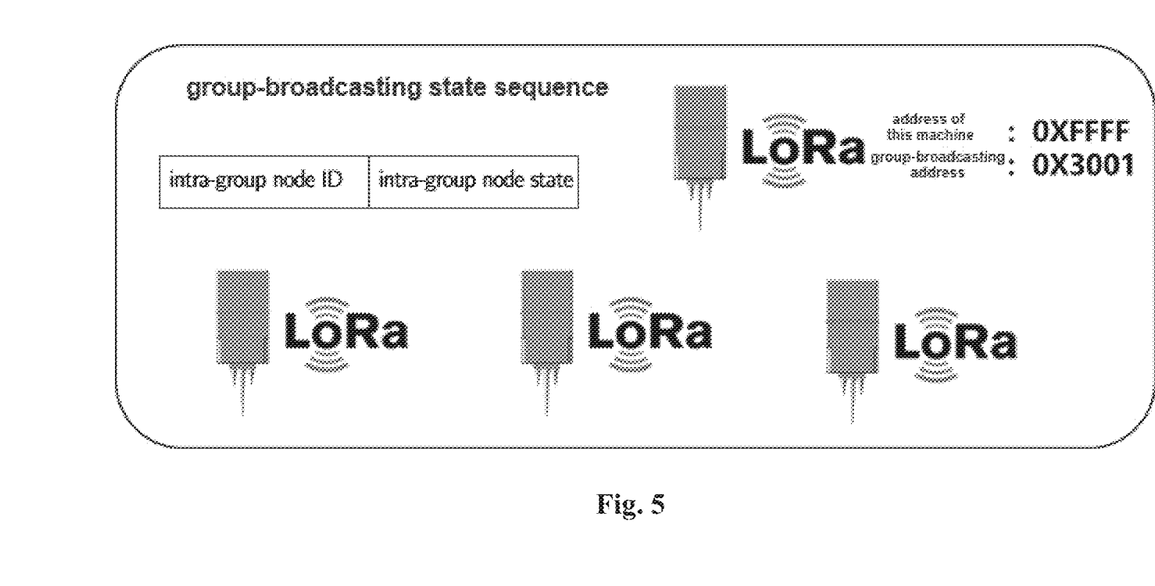
FIG. 5 is a schematic diagram of intra-group broadcasting information of the edge calculation device according to Embodiment 1 of the present disclosure.
Figure 6:
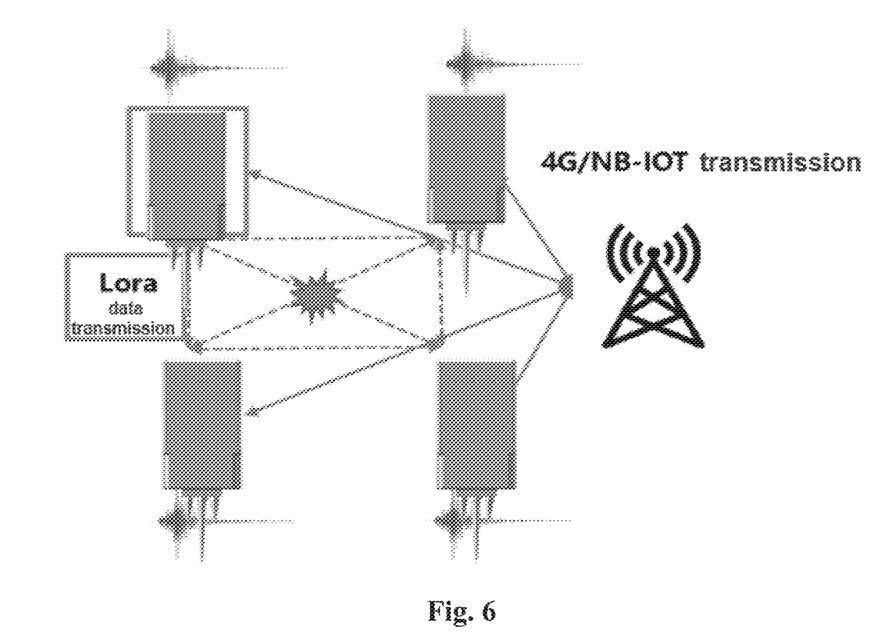
FIG. 6 is a schematic diagram of an intra-group broadcasting process of the edge calculation device according to Embodiment 1 of the present disclosure.

Specifically, in the operation of determining whether the grouped edge calculation devices satisfy the preset collection conditions, firstly, the grouped edge calculation devices intra-group broadcast the state information, wherein the state information is used to record monitoring states of the edge calculation devices, e.g. whether there is an abnormality. Referring to FIG. 5 and FIG. 6, for example, a Lora data transmission manner can be used to perform intra-group broadcasting. Then, referring to FIG. 7, the number of edge calculation devices in which the state information in the group satisfies the preset trigger condition is calculated (corresponding to the pre-trigger determination in FIG. 7). Finally, it is determined whether the grouped edge calculation devices satisfy the preset collection conditions according to the number of devices and the preset first threshold. For example, an abnormality may appear in a case where the number of devices exceeds the first threshold, and thus it is necessary to collect the data and open the micro-earthquake data analyzing model to perform analysis.

Alternatively, the state information includes state identification, and before calculating the number of the edge calculation devices in which the state information in the group satisfies the preset trigger condition, further includes: determines whether the state information in the group satisfies the preset trigger condition according to the state identification.

Figure 7:
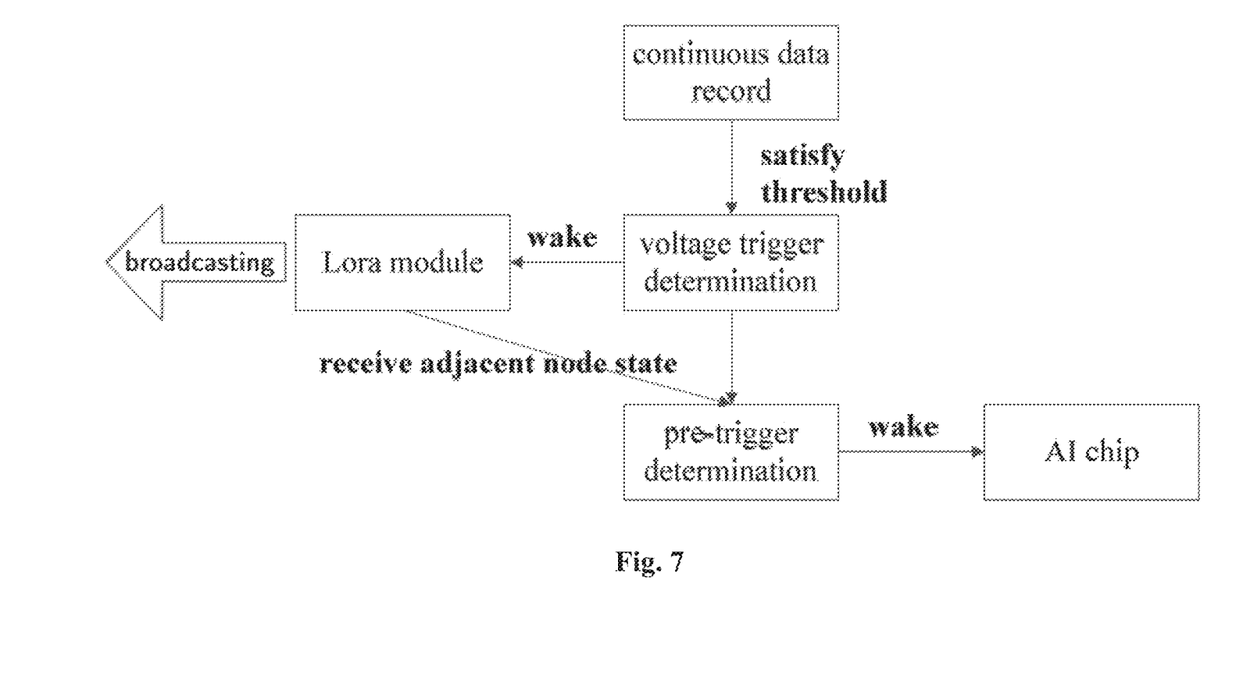
FIG. 7 is a schematic diagram of a trigger logic of the edge calculation device according to Embodiment 1 of the present disclosure.

Specifically, the state information broadcasted by the edge calculation device in the group includes, for example, state identification, and further includes an ID of the edge calculation device. Before the number of the edge calculation devices in which the state information in the group satisfies the preset trigger condition is calculated, this scheme further determines whether the state information in the group satisfies the preset trigger condition according to the state identification. In one specific example, the state identification is a type of bool, that is, there are only identification of True and False. After deployment, the edge calculation device sets a signal minimum trigger threshold by the circuit. As shown in FIG. 7, after the collected signal voltage exceeds the minimum trigger threshold, the state identification of the edge calculation device is True. When the state identification is True, it is determined that the state information in the group satisfies the preset trigger condition, and meanwhile the field corresponding to group-broadcasting is updated immediately.

Alternatively, this scheme further includes: the remote server 200 visually displays the effective event data, such that the staff can browse the effective event data directly to monitor the micro-earthquake.

In one specific example, this scheme includes the following steps:

1. grouping the communication according to the deployment area position of a node seismograph (corresponding to the above edge calculation device)

1) The grouping of the communication is divided according to the number of deployment nodes, the geological area division of deployment nodes, and the communication relay situation in the geological structure analyzing phase at the early stage of construction.

2) The first station of each communication group is responsible for group-broadcasting information management.

2. pre-triggering and group-broadcasting signal amplitudes in groups of the multi-node seismograph for the collected earthquake data 1) Group-broadcasting is performed using a Lora ultra-long distance and ultra-low power communication technology. The broadcasting content is the pre-trigger state of each node in the group, which is a string composed of the ID of each node in the group and the trigger state thereof, as shown in FIG. 5.

2) The pre-trigger state is a type of bool, that is, there are only states of True and False. After deployment, the node sets a signal minimum trigger threshold by the circuit. After the collected signal voltage exceeds the minimum trigger threshold, the pre-trigger state of the node changes to be True, and meanwhile the field corresponding to group-broadcasting is updated immediately.

3. Performing artificial intelligence accurate events and first-break calculation of each node in the group for the earthquake station groups satisfying the pre-trigger state of the group 1) When the stations satisfying the pre-trigger state in the group meet the preset number, the group-broadcasting will send out a calculation instruction immediately. All nodes in the group immediately turn on the artificial intelligence calculation function in their nodes to pick up the accurate artificial intelligence events. The logic of the control circuit in the nodes thereof is as shown in FIG. 7.

4. Uploading the effective event data, the node number and the group number of each node seismograph to a cloud calculation platform via a communication network 5. Performing grouping and transfer learning, by the cloud calculation platform, by combining the data acquired locally in real time with the standard micro-earthquake database, and updating the latest artificial intelligence calculation model in each group 1) The cloud calculation platform, after receiving the data, first uses professionals to check the data manually, especially check data for which the current calculation is insufficient and mark the data.

2) The communication group, after accumulating enough labeled data, transfer-learns and updates the artificial intelligence micro-earthquake picking algorithm using the method of transfer learning in combination with the standard micro-earthquake database (the standard database such as the National Earthquake Network).

3) The specific update method is to extract features output from the last layer of Bi-LSTM in the CNN+RNN-based micro-earthquake depth picking network MSnet (as shown in FIG. 5) trained using the standard data, and reestablish a mapping relationship from the feature output layer to the full connection layer by performing fine-tune.

4) The grouped artificial intelligence calculation models that are updated are updated to the earthquake nodes in each group via the communication network.

In addition, referring to FIG. 1, there is provided a non-transitory storage medium according to a second aspect of the present embodiment. The non-transitory storage medium includes the stored program, wherein the method stated by any one of the above is executed by a processor when the program is running.

Thus, according to the present embodiment, the remote server 200 can receive the effective event data from the edge calculation device 210, then performs a transfer training to the micro-earthquake data analyzing model deployed by the edge calculation device 210 using the effective event data, and finally updates the model by transmitting the model that has been transfer-trained to the edge calculation device 210. Therefore, compared with use of the fixed algorithm model in the prior art, this scheme can flexibly update the model according to the actually collected effective event data, thereby realizing the purpose of capable of dealing with different geographical conditions, and achieving the technical effect of accurately collecting micro-earthquake data according to the actual geographical conditions. In addition, the collected data can be analyzed and processed using the model at the edge calculation device side, such that only the effective event data is transmitted so as to save resources and improve the transmission efficiency, thereby solving the technical problem that it is impossible to adjust parameters adaptively according to the actual detection environment or ground conditions since the parameters of the algorithm model of the micro-earthquake collecting devices are fixed, and thus it is impossible to accurately collect micro-earthquake data according to the actual environment in the prior art.

It should be explained that, for the sake of simple description, each method embodiment as mentioned above is described as a series of action combinations. However, those skilled in the art should know that the present invention is not limited by the described action sequence, since some steps can be carried out in other sequences or at the same time depending on the present invention. Secondly, those skilled in the art should also know that the embodiments described in the description are all preferred embodiments, and the actions and modules involved are not necessary for the present invention necessarily.

Through description of the above embodiments, those skilled in the art can clearly understand that the method according to the above embodiments can be realized by means of software and the necessary general hardware platform, and of course, by means of hardware, but in many cases, the former is a better embodiment. Based on this understanding, the technical solution of the present invention substantively or the section for which the present invention makes contribution over the prior art can be embodied in the form of software product, wherein the computer software product is stored in a storage medium (such as ROM/RAM, a magnetic disk and an optical disk) and includes several instructions to enable one terminal device (which can be a mobile phone, a computer, a server, a network device or the like) to execute the methods described in each embodiment of the present invention.

Embodiment 2

Figure 8:
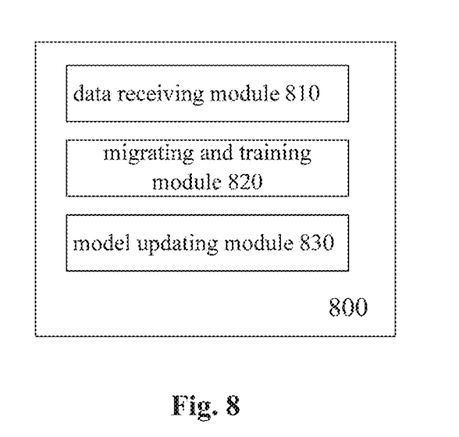
FIG. 8 is a schematic diagram of the micro-earthquake data processing apparatus according to Embodiment 2 of the present disclosure.

FIG. 8 illustrates a micro-earthquake data processing apparatus 800 according to the present embodiment, and the apparatus 800 corresponds to the method according to the first aspect of the Embodiment 1. Referring to FIG. 8, the apparatus 800 comprises: a data receiving module 810 for receiving, by the remote server, effective event data related to the micro-earthquake from the edge calculation device, wherein the effective event data is obtained, by the edge calculation device, by means of calculating and analyzing the micro-earthquake data collected by the edge calculation device by using the micro-earthquake data analyzing model; a transfer training module 820 for performing a transfer training to the micro-earthquake data analyzing model by the remote server according to the effective event data; and a model updating module 830 for updating the model after the micro-earthquake data analyzing model that has been transfer-trained is transmitted to the edge calculation device by the remote server.

Alternatively, the apparatus 800 further includes: a collection module for collecting micro-earthquake data by an edge calculation device; a processing module for analyzing and calculating the micro-earthquake data by the edge calculation device using a micro-earthquake data analyzing model, and generating effective event data corresponding to the micro-earthquake data; and a data transmitting module for transmitting the effective event data to the remote server by the edge calculation device.

Alternatively, the micro-earthquake data analyzing model includes a feature extraction layer, a feature output layer and a full connection layer. Moreover, the transfer training module includes: a network extracting sub-module for freezing network structures of the feature extraction layer by the remote server; and a mapping relationship training sub-module for training, by the remote server, the mapping relationship between the feature output layer and the full connection layer using the effective event data and the standard micro-earthquake data acquired from the preset standard micro-earthquake database.

Alternatively, the edge calculation device is a plurality of edge calculation devices, wherein the plurality of edge calculation devices is used to collect the effective event data at different locations, respectively. Moreover, the transfer training module 820 includes: a first training sub-module for performing a transfer training to, by the remote server, the micro-earthquake data analyzing model deployed by the corresponding edge calculation device according to the effective event data transmitted by each edge calculation device.

Alternatively, the plurality of edge calculation devices is divided into a plurality of groups. Moreover, the transfer training module 820 includes: a second training sub-module for performing a transfer training to, by the remote server, the micro-earthquake data analyzing model deployed by the grouped edge calculation devices according to the effective event data transmitted by the edge calculation devices in each group.

Alternatively, the apparatus 800 further includes: a determination sub-module for determining whether the grouped edge calculation devices satisfy the preset collection conditions; and a collection sub-module for collecting, in a case of satisfying the preset collection conditions, the micro-earthquake data by the edge calculation devices in each group.

Alternatively, the determination sub-module includes: a broadcasting unit for intra-group broadcasting state information by the grouped edge calculation devices, wherein the state information is used to record monitoring states of the edge calculation devices; a trigger unit for calculating a number of edge calculation devices in which the state information in the group satisfies the preset trigger condition; and a first determination unit for determining whether the grouped edge calculation devices satisfy the preset collection conditions according to the number of devices and a preset first threshold.

Alternatively, the state information includes state identification, and the apparatus 800 further includes: a second determination unit for determining whether the state information in the group satisfies the preset trigger condition according to the signal voltage and the preset second threshold.

Alternatively, the apparatus 800 further includes: a display module for visually displaying the effective event data by the remote server.

Thus, according to the present embodiment, the remote server can receive the effective event data from the edge calculation device, then performs a transfer training to the micro-earthquake data analyzing model deployed by the edge calculation device using the effective event data, and finally updates the model by transmitting the model that has been transfer-trained to the edge calculation device. Therefore, compared with use of the fixed algorithm model in the prior art, this scheme can flexibly update the model according to the actually collected effective event data, thereby realizing the purpose of capable of dealing with different geographical conditions, and achieving the technical effect of accurately collecting micro-earthquake data according to the actual geographical conditions. In addition, the collected data can be analyzed and processed using the model at the edge calculation device side, such that only the effective event data is transmitted so as to save resources and improve the transmission efficiency, thereby solving the technical problem that it is impossible to adjust parameters adaptively according to the actual detection environment or ground conditions since the parameters of the algorithm model of the micro-earthquake collecting devices are fixed, and thus it is impossible to accurately collect micro-earthquake data according to the actual environment in the prior art.

Embodiment 3

Figure 9:
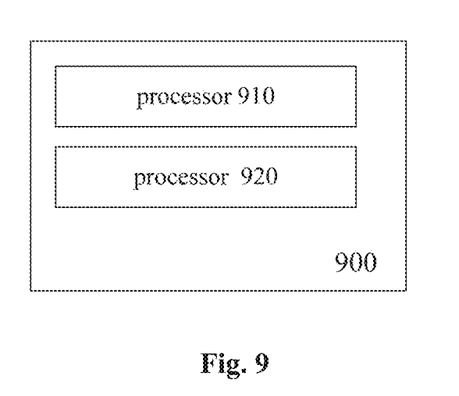
FIG. 9 is a schematic diagram of the micro-earthquake data processing apparatus according to Embodiment 3 of the present disclosure.

FIG. 9 illustrates a micro-earthquake data processing apparatus 900 according to the present embodiment, and the apparatus 900 corresponds to the method according to the first aspect of the Embodiment 1. Referring to FIG. 9, the apparatus 900 comprises a processor 910; and a memory 920 connected to the processor 910, which is used for providing instructions to process the following processing steps to the processor 910: receiving, by the remote server, effective event data related to the micro-earthquake from the edge calculation device, wherein the effective event data is obtained, by the edge calculation device, by means of calculating and analyzing the micro-earthquake data collected by the edge calculation device by using the micro-earthquake data analyzing model; performing a transfer training to the micro-earthquake data analyzing model by the remote server according to the effective event data; and updating the model after the micro-earthquake data analyzing model that has been transfer-trained is transmitted to the edge calculation device by the remote server.

Alternatively, the remote server, before the operation of receiving the effective event data related to the micro-earthquake from the edge calculation device, further includes: the edge calculation device collects the micro-earthquake data; the edge calculation device analyzes and calculates the micro-earthquake data using the micro-earthquake data analyzing model and generates the effective event data corresponding to the micro-earthquake data; and the edge calculation device transmits the effective event data to the remote server.

Alternatively, the micro-earthquake data analyzing model includes a feature extraction layer, a feature output layer and a full connection layer. According to the effective event data, the remote server performs the operation of performing a transfer training to the micro-earthquake data analyzing model, comprising: the remote server freezes network structures of the feature extraction layer; and the remote server trains the mapping relationship between the feature output layer and the full connection layer using the effective event data and the standard micro-earthquake data acquired from the preset standard micro-earthquake database.

Alternatively, the edge calculation device is a plurality of edge calculation devices, wherein the plurality of edge calculation devices is used to collect the effective event data at different locations, respectively, and perform a transfer training to the micro-earthquake data analyzing model, comprising: the remote server performs a transfer training to the micro-earthquake data analyzing model deployed by the corresponding edge calculation device according to the effective event data transmitted by each edge calculation device.

Alternatively, the plurality of edge calculation devices is divided into a plurality of groups, and perform a transfer training to the micro-earthquake data analyzing model, including: the remote server performs a transfer training to the micro-earthquake data analyzing model deployed by the grouped edge calculation devices according to the effective event data transmitted by the edge calculation devices in each group.

Alternatively, the edge calculation device, before collecting the micro-earthquake data, further includes: determines whether the grouped edge calculation devices satisfy the preset collection conditions; and in a case of satisfying the preset collection conditions, the edge calculation devices in each group collect the micro-earthquake data.

Alternatively, determining whether the grouped edge calculation devices satisfy the preset collection conditions includes: the grouped edge calculation devices intra-group broadcast state information, wherein the state information is used to record monitoring states of the edge calculation devices; calculates a number of edge calculation devices in which the state information in the group satisfies the preset trigger condition; and determines whether the grouped edge calculation devices satisfy the preset collection conditions according to the number of devices and a preset first threshold.

Alternatively, the state information includes state identification, and before calculating the number of the edge calculation devices in which the state information in the group satisfies the preset trigger condition, further includes: determines whether the state information in the group satisfies the preset trigger condition according to the signal voltage and the preset second threshold.

Alternatively, the memory 920 is further used for providing instructions to process the following processing steps to the processor 910: visually displaying the effective event data by the remote server.

Thus, according to the present embodiment, the remote server can receive the effective event data from the edge calculation device, then performs a transfer training to the micro-earthquake data analyzing model deployed by the edge calculation device using the effective event data, and finally updates the model by transmitting the model that has been transfer-trained to the edge calculation device. Therefore, compared with use of the fixed algorithm model in the prior art, this scheme can flexibly update the model according to the actually collected effective event data, thereby realizing the purpose of capable of dealing with different geographical conditions, and achieving the technical effect of accurately collecting micro-earthquake data according to the actual geographical conditions. In addition, the collected data can be analyzed and processed using the model at the edge calculation device side, such that only the effective event data is transmitted so as to save resources and improve the transmission efficiency, thereby solving the technical problem that it is impossible to adjust parameters adaptively according to the actual detection environment or ground conditions since the parameters of the algorithm model of the micro-earthquake collecting devices are fixed, and thus it is impossible to accurately collect micro-earthquake data according to the actual environment in the prior art.

The serial number of the above embodiments of the present invention is only for description, and does not represent the advantages and disadvantages of the embodiments.

In the above-mentioned embodiments of the present invention, description of each embodiment has its own emphasis. For the section not described in detail in a certain embodiment, please refer to the relevant description of other embodiments.

In several embodiments provided by the present application, it should be understood that the disclosed technical content can be realized by other manners. Wherein, the apparatus embodiments described above are only illustrative, for example, division of the units is only a logical function division, and there may be additional division manners in actual implementation, e.g. a plurality of units or components can be combined or integrated into another system, or some features can be ignored or not executed. On the other hand, the mutual coupling or direct coupling or communication connection shown or discussed can be indirect coupling or communication connection of by some interfaces, units or modules, and can be electrical or other forms.

The units explained as separate components may or may not be physically separated, and the components as display units may or may not be physical units, that is, they may be located at one location or may also be distributed to a plurality of network units. Some or all of the units therein can be selected according to the actual demands to achieve the purpose of implementing the solution of the present embodiment.

In addition, each functional unit in each embodiment of the present invention can be integrated in one processing unit, each unit can exist independently and physically, or two or more units can be integrated in one unit. The above integrated units can be realized in a form of hardware, and can also be realized using a form of software functional unit.

If the integrated units are realized in the form of software functional unit, and sold or used as independent products, they can be stored in a computer readable storage medium. Based on this understanding, the technical solution of the present invention or the section for which the present invention makes contribution over the prior art or all or part of the technical solution can be embodied in the form of software product, and the computer software product is stored in a storage medium, including several instructions to enable a computer device (which can be a personal computer, a server, a network device or the like) to execute all or partial steps of the method according to each embodiment of the present invention. The aforementioned storage medium includes various media capable of storing the program code, such as a U disk, a read only memory (ROM), a random access memory (RAM), a mobile hard disk, a magnetic disk, an optical disk, etc.

The foregoing is merely preferred embodiments of the present invention. It shall be pointed out that various changes and modifications may be made on the present application by those skilled in the art without departing from the principle of the present invention. These changes and modifications should also fall within the scope of protection of the present invention.

What is claimed is:

1. An artificial intelligence calculation method for monitoring an earthquake in real time based on edge cloud cooperation, which is applied to a micro-earthquake data processing system, the micro-earthquake data processing system comprises an edge calculation device and a remote server that is in communication connection with the edge calculation device, wherein the remote server deploys a micro-earthquake data analyzing model based on an artificial intelligence to the edge calculation device in advance, and the method comprises: comprising:
  receiving, by a remote server, effective event data related to a micro-earthquake from an edge calculation device, wherein the effective event data is obtained, by the edge calculation device, by means of calculating and analyzing the micro-earthquake data collected by the edge calculation device by using a micro-earthquake data analyzing model;
  performing a transfer training to the micro-earthquake data analyzing model by the remote server according to the effective event data, wherein data is manually checked after the effective event data is received, data for which the current calculation is insufficient is checked, the data is labeled, and when there are enough labeled data, the model is transfer-trained using the method of transfer learning; and
  updating the model after the micro-earthquake data analyzing model that has been transfer-trained is transmitted to the edge calculation device by the remote server, wherein the remote server, before the operation of receiving the effective event data related to the micro-earthquake from the edge calculation device, further includes: the edge calculation device collects the micro-earthquake data; the edge calculation device analyzes and calculates the micro-earthquake data using the micro-earthquake data analyzing model and generates the effective event data corresponding to the micro-earthquake data; and the edge calculation device transmits the effective event data to the remote server; and
wherein the method is applied to a micro-earthquake data processing system; the micro-earthquake data processing system comprises an edge calculation device and a remote server in communication connection with the edge calculation device; the remote server deploys the micro-earthquake data analyzing model based on an artificial intelligence to the edge calculation device in advance;
wherein the micro-earthquake data analyzing model is a micro-earthquake depth picking network MSnet trained using standard data sets, the micro-earthquake depth picking network MSnet is based on a convolutional neural network (CNN) and a recurrent neural network (RNN); the micro-earthquake data analyzing model includes a feature extraction layer, a feature output layer and a full connection layer, wherein the feature extraction layer consists of four layers of convolution layers, the convolution kernel of the first layer of convolution layer is a 9 by 9 convolution kernel, the convolution kernel of the fourth layer of convolution layer is a 3 by 3 convolution kernel, there is one pooling layer for which the pooling kernel is 3 between two layers of convolution layers, the feature output layer includes three layers of a long short-term memory (LSTM) structure and one Projection Layer, each LSTM layer contains 632 units, and the Projection Layer contains 600 units, and the full connection layer has two layers; and
the remote server performs an operation of transfer-training the micro-earthquake data analyzing model according to the effective event data, comprising: the remote server trains a mapping relationship between the feature output layer and the full connection layer using the effective event data and standard micro-earthquake data acquired from a preset standard micro-earthquake database, extracts features output from the last layer of the LSTM structure out, fine-tunes the model using the effective event data and standard micro-earthquake data acquired from the preset standard micro-earthquake database, and reestablishes a mapping relationship from the feature output layer to the full connection layer; and
wherein the edge calculation device is a plurality of edge calculation devices, and the plurality of edge calculation devices is divided into a plurality of groups, wherein the plurality of groups is deployed at different locations, at least one edge calculation device is deployed at each location, the micro-earthquake data analyzing models of the edge calculation devices in each group are the same, and the plurality of edge calculation devices is used to collect the effective event data at different locations, respectively; and the remote server performs a transfer training to the micro-earthquake data analyzing model deployed by the grouped edge calculation devices according to the effective event data transmitted by the edge calculation devices in each group, then transmits the micro-earthquake data analyzing model that has been transfer-trained is transmitted to the group, and updates the micro-earthquake data analyzing model of the edge calculation device in the group, and wherein the edge calculation device, before collecting the micro-earthquake data, further includes: judges whether the grouped edge calculation devices satisfy preset collection conditions; and in a case of satisfying the preset collection conditions, the edge calculation devices in each group collect the micro-earthquake data; and wherein judging whether the grouped edge calculation devices satisfy preset collection conditions includes: the grouped edge calculation devices intra-group broadcast state information, wherein the state information is used to record monitoring states of the edge calculation devices; calculating a number of edge calculation devices in which the state information in the group satisfies a preset trigger condition; and judging whether the grouped edge calculation devices satisfy the preset collection conditions according to the number of devices and a preset first threshold; and wherein the state information includes state identification, and before calculating the number of the edge calculation devices in which the state information in the group satisfies the preset trigger condition, further includes: judging whether the state information in the group satisfies a preset trigger condition according to the state identification, wherein pre-triggering and group-broadcasting signal amplitudes in groups of the multi-node seismograph are carried out for the collected earthquake data, group-broadcasting is performed using a Lora ultra-long distance and ultra-low power communication technology, the broadcasting content is a pre-trigger state of each node in the group, which is a string composed of an ID of each node in the group and a trigger state thereof, and the pre-trigger state is a type of bool; after deployment, the node sets a signal minimum trigger threshold by a circuit, after the collected signal voltage exceeds a minimum trigger threshold, the pre-trigger state of the node changes to be True, judging that state information in the group satisfies the preset trigger condition, and meanwhile updating fields corresponding to group-broadcasting immediately.

2. The method according to claim 1, wherein the method further comprises visually displaying the effective event data by the remote server.

3. A non-transitory storage medium, comprising: a storage program; wherein the method according to claim 1 is executed by a processor when the storage program is running.

* * * * *